United States Patent

Muhlfeld

[15] 3,667,137
[45] June 6, 1972

[54] APPARATUS FOR TEACHING ELECTRICAL CONCEPTS

[72] Inventor: Frank J. Muhlfeld, 300 North Street, Greenwich, Conn. 06830

[22] Filed: Apr. 6, 1970

[21] Appl. No.: 25,734

[52] U.S. Cl. ........................................................35/19 A
[51] Int. Cl. ..............................................................G09b 23/18
[58] Field of Search ....................................35/19 R, 19 A, 10

[56] References Cited

OTHER PUBLICATIONS

Chicago Apparatus Co. Catalog, page 296.

Welch Scientific Co. Catalog, pages 66 and 85.

*Primary Examiner*—Wm. H. Grieb
*Attorney*—Sandoe, Hopgood and Calimafde

[57] ABSTRACT

A method of teaching electrical concepts such as voltage, current and resistance by the use of an analogous mechanical model is disclosed in which potential is simulated by releasing a ball from an elevated position, and electron conduction is simulated by the arrangement of a plurality of abutting balls on a track that are contacted by the released ball.

5 Claims, 4 Drawing Figures

PATENTED JUN 6 1972

3,667,137

INVENTOR.
FRANK J. MUHLFELD
BY
Sandoe, Hopgood & Calimafde
ATTORNEYS

APPARATUS FOR TEACHING ELECTRICAL CONCEPTS

This invention relates generally to teaching methods and apparatus, and more particularly to a method for demonstrating the meaning of electrical concepts by the use of mechanical analogs.

In the teaching of relatively abstract subject matter it has been found to be of great value to represent the subject matter by the use of mechanical models which perform in an analogous manner to the abstract concept. Typical of these teaching methods is the one with which the present invention is involved, to wit, the teaching of electrical concepts such as the meaning of electromotive force, current, resistance, and the like.

It has been customary in the past to describe electrical concepts in terms of their analogy to hydraulic circuits in which the flow of water is analogous to the flow of electric current, and a pump is analogous to a voltage source. An analogy of this type has been found to be helpful but its utilization, such as in schools, has been limited since this approach assumes that the student is familiar with hydraulics. Moreover, demonstrations of analogous hydraulic systems have been limited by the high cost and cumbersome nature of the equipment required for such demonstrations.

It is an object of this invention to provide a method and apparatus for teaching electrical concepts by the use of a readily comprehended mechanical analogy.

It is a further object of the invention to provide a teaching method of the type described in which the necessary mechanical components are relatively inexpensive and easily assembled and manipulated in the demonstration.

It is another object of the invention to provide a teaching method of the type described in which subtle electrical concepts can be made readily understood to the student in an effective manner which holds the attention of the student.

The present invention provides a simulation of an electrical circuit by an analogous mechanical model in which the circuit is comprised of a high voltage source, air gaps, wires and resistors. The simulating mechanical apparatus is comprised of a track having an elevated portion and a lower level portion on which a plurality of abutting balls are arranged. Voltage is simulated by releasing a ball from the elevated portion which contacts the balls on the track level portion. An open area on the track, that is, an area in which there are no balls, simulates an air gap while a row of side-by-side abutting balls correspond to a conductor. A compressible member such as a sponge-like wafer may be interposed between the balls to simulate a resistor.

To the accomplishment of the above and to such further objects as may hereinafter appear, the present invention relates to a teaching apparatus and method substantially as defined in the appended claims and as described in the following specification taken together with the accompanying drawings in which:

The present invention has for its purpose the illustration of electrical concepts by means of a mechanical analog system, in which the analogies are readily grasped and appreciated by the student.

Figure 1:
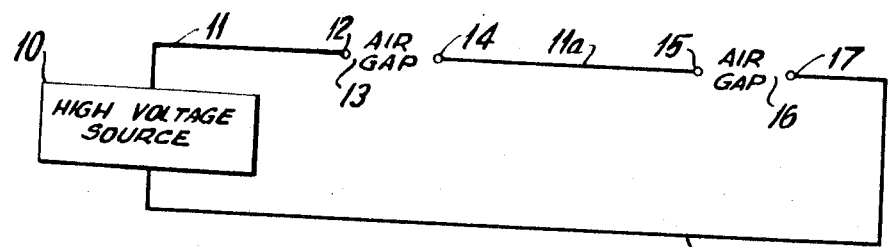
FIG. 1 is a schematic diagram of an electrical circuit which may be simulated by the apparatus of the invention.

FIG. 1 is a schematic diagram of a circuit which exhibits some of the basic electrical properties that can be represented and demonstrated by the method and apparatus of the invention. In that circuit, a variable high voltage source 10 has one terminal connected by a conductor 11 to a point 12. An air gap 13 is defined between point 12 and a point 14 spaced therefrom. Point 14 is in turn connected by a length of conductor 11a to a point 15 which defines with a spaced point 16, a second air gap 17. Point 17 is connected to the other terminal of voltage source 10 by a conductor 18.

In a classroom demonstration of the circuit of FIG. 11, source 10 is varied until electrons jump across air gaps 13 and 16. A brief discussion would then be given of the need of a minimum or threshold voltage required to establish sparking across the air gaps, and the nature of electronic flow across the gaps and through the conductors in the circuit. These concepts are then illustrated by the mechanical analogs obtained by the use of the apparatus of FIGS. 2 and 3.

Figure 2:
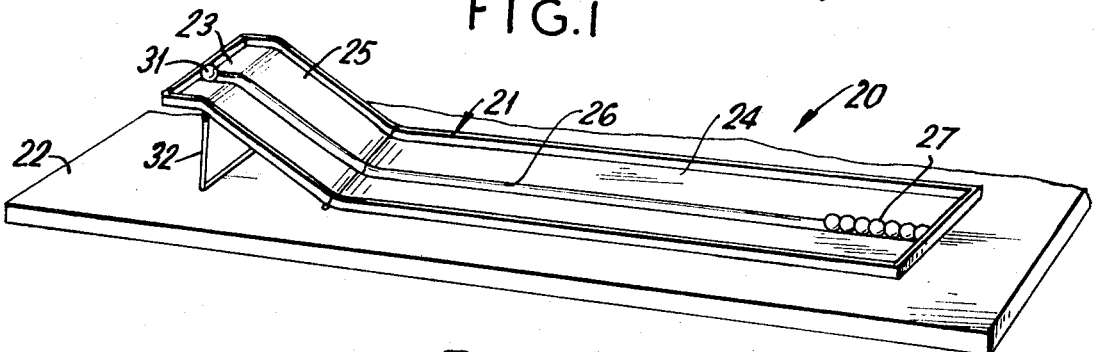
FIG. 2 is a perspective view of a first portion of the teaching apparatus of the invention.

The mechanical apparatus shown in FIG. 2 generally designated 20 comprises a track 21 shown resting on a horizontal surface 22. Track 21 comprises an adjustable elevated platform 23, a long level portion 24, and a sloping portion or ramp 25 connecting platform 23 and level portion 24 and being pivotably connected to the latter. A central longitudinal groove 26 extends continuously along the flat and sloping portions of the track, and a group of abutting spherical metallic balls 27 are positioned at the right end of track 21 in groove 26.

A second track apparatus illustrated in FIG. 3 generally designated 28 is preferably utilized in the practice of the invention along with the apparatus of FIG. 2 to provide a basis for comparison as will be described below. Track apparatus 28 is substantially identical to track apparatus 20 and corresponding elements of the former are designated by the reference numerals in FIG. 2 to which the subscript a has been added. Track apparatus 28 differs from track apparatus 20 in that two spaced groups of balls 29 and 30 are arranged within groove 26a along the level portion 24a of track 21a.

In operation, a ball 31 is placed on elevated platform 23, released and allowed to roll down the ramp 25 in the groove 26 to the level part of the track until it reaches the inwardmost one of balls 27 at which time it will come to an abrupt halt. Similarly in the apparatus of FIG. 3, a ball 31 released down ramp 25a will contact the innermost one of balls 29a and will come to an abrupt stop. However, as is known, according to principles of the conservation of energy and momentum, the impact of ball 31 on the innermost one of the balls 29a in group 29 will cause the outermost ball 29b to leave group 29 and proceed along groove 26a at a velocity substantially equal to the impact velocity of ball 31 until it reaches the innermost ball in the group of balls 30 at which time ball 29b will come to an abrupt halt.

Varying the height of ramp 25 as by operating an adjusting linkage mechanism 32 positioned beneath the ramp, results in varying velocities of the ball along the level portion of the track since the potential energy of the impact ball varies directly as the height of the ramp. As is known the potential energy is converted to kinetic energy when the impact ball reaches the level portion of the track. In the mechanical system of FIGS. 2 and 3, the adjustable ramp is analogous to the variable voltage source 10 of the circuit of FIG. 1, the open track areas, e.g. the spacing between balls 29 and 30 in the FIG. 3 apparatus, is analogous to the air gaps in the circuit, and the groups of abutting balls 27, 29 and 30 are analogous to the conductors of the circuit.

Thus, varying the release height of the impact ball 31 corresponding to an increase in the voltage source 10 produces an increase in the velocity of the balls in the open track space (the air gaps in the circuit). In this manner the student viewing the mechanical system quickly comprehends the phenomenon of the increase in air gap conduction as a result of an increase in the potential across the gap.

To illustrate the principle that the speed of the electrons in the air gap is not equal to the speed of electron flow in the conductor, and is in fact much slower, the ramps of track apparatus 20 and 28 are both placed at substantially the same level and impact balls 31 and 31a are released simultaneously from their respective elevated platforms. Both balls arrive at the level portion of the track at the same velocity. However, the ball in track apparatus 28 (FIG. 3) upon striking the innermost ball 29b in group 29 will immediately cause the outermost ball 29b in that group to leave the group at the same velocity as the impact ball. Ball 29b then proceeds toward the group of balls 30 until it strikes the innermost ball in that group. Meanwhile, the impact ball 31 moving along apparatus 20 continues along the level portion 24 of track 21 until it strikes the innermost ball in group 27. That impact will occur later in time than the impact of ball 29b on the innermost ball in group 30.

This comparative demonstration clearly indicates the nature of electron transfer or flow in a conductor with each ball in group 29 representing a unit of charge, such as an electron or 1 coulomb, in that rather than a single electron flowing completely through the conductor as it would through the air gap, the conduction in the conductor is the result of the transfer between adjacent electrons in the conductor as simulated by the transfer of velocity between the abutting balls in group 29 between balls 29a and 29b. Significantly, this demonstration indicates to the student that the rate of energy flow (or current) through the conductor is greater than that through the air gap (along the open space in the track).

Figure 3:
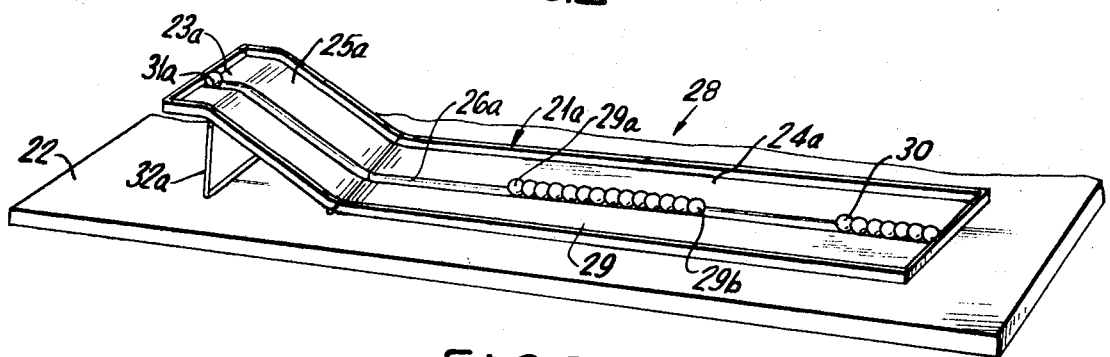
FIG. 3 is a perspective view of a second portion of the apparatus for use with the portion of FIG. 2 in the practice of the invention.
Figure 4:
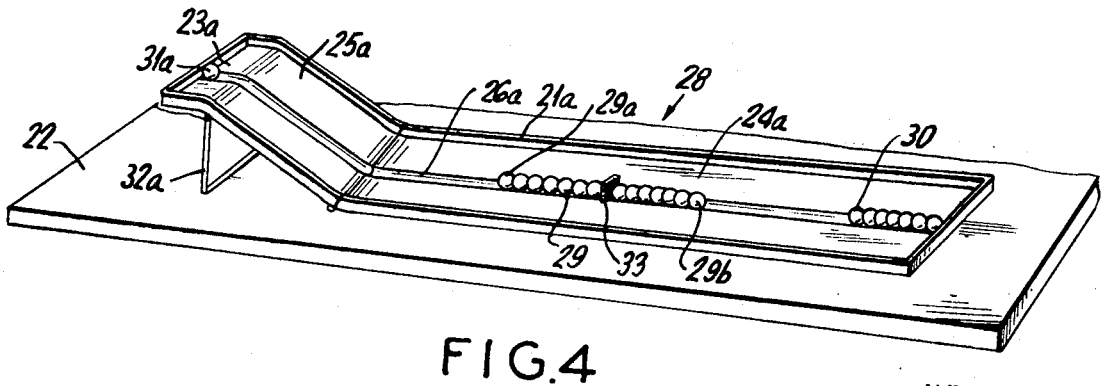
FIG. 4 is a perspective view of the portion of FIG. 2 modified to illustrate the concept of electrical resistance.

The concept of resistance may be readily demonstrated by the modification of the track apparatus 28 of FIG. 3 as illustrated in FIG. 4 in which a sponge like wafer 33 of compressible, energy-absorbing material is interposed between any adjacent two balls in group 29. This corresponds to the connection of a resistance (not shown) in series with conductor 11a between circuit points 14 and 15 in any known manner such as by the use of a double-pole switch.

In the demonstration of the circuit of FIG. 1 as modified by the inclusion of the series-connected resistance, it will be noticed that a higher voltage from source 10 is required to initiate a spark across the air gaps 13 and 16. In the apparatus of FIG. 4, when a ball is released down ramp 25a it will again travel at an initial velocity along the open section of track corresponding to the electron flow across air gap 13, until it strikes the innermost ball 29a in group 29. That impact energy will be in part absorbed by the compressible wafer 33 and the ball 29b leaving the group 29 will travel at a reduced velocity along the portion of track between groups 29 and 30 (corresponding to air gap 16 in the circuit).

If a thicker wafer were used or if two or more wafers were interposed in group 29, the final velocity of the ball 29b would be even further reduced. Thus, the concept of electrical resistance may be visually demonstrated by the apparatus of the invention, by demonstrating the loss of kinetic energy from the impact ball 31 to the final ball 29b. Similarly, in the electrical circuit, the greater the amount of resistance placed between points 14 and 15, the greater will be the loss of electrical energy, and the fewer charges that are caused to flow across air gap 16 in a given period of time.

A dramatic finale for the demonstration may be achieved in the practice of the invention through the simultaneous use of the apparatus of FIGS. 2 and 4 by placing a sufficient number of sponge wafers 33 in group 29 so as to cause simultaneously released impact ball 31 of FIG. 2 apparatus, and ball 31a of the FIG. 4 apparatus to arrive simultaneously at the innermost balls in groups 27 and 30 respectively. The resistance in the analogous conductor — i.e. group 29, is now made substantially equal to the resistance of the corresponding portion of open track in the FIG. 2 apparatus, i.e. the analogous air gap.

The teaching method and apparatus of the invention is thus highly suitable for demonstrating basic electrical concepts such as conduction, resistance, and voltage to a group of students. As the students' level of understanding is increased, the method and apparatus can be further utilized to advantage in demonstrating more advanced concepts such as Kirchoff's laws, air gap resistance, spark visibility phenomena, and the like.

While the principles of the invention have been described in connection with a specific embodiment thereof, it is to be clearly understood that this description is made only by way of example and not as a limitation to the scope of the invention.

I claim:

1. A method for demonstrating electrical concepts comprising the steps of simulating a variable voltage source by providing a track having a variable raised portion on one end thereof and a level section in communication with said raised portion, releasing a ball from said raised portion, simulating an electrical conductor by arranging a plurality of balls on said level section, adjacent ones of said plurality of balls being in substantial abutting relation with one another, simulating an air gap in an electrical circuit by providing an open portion free of said balls on said level section, and interposing at least one energy absorbing member between adjacent ones of said balls to simulate electrical resistance.

2. The method of claim 1, in which two of said tracks are provided, each of said tracks having a first plurality of said balls on one end of said level section, and one of said tracks has a second plurality of balls spaced on said level section from said first plurality of balls, thereby defining said open portion of track therebetween.

3. The method of claim 2, further comprising the step of substantially simultaneously releasing said ball from the raised portions of both of said tracks.

4. Apparatus for demonstrating electrical concepts comprising first and second tracks having a raised ramp portion and a level section in communication therewith and a longitudinal groove extending into said raised portion and along said level section, a first plurality of balls in abutting relationship arranged in said groove in each of said tracks, a second plurality of balls arranged in abutting relationship in said groove and spaced from said first plurality of balls in only one of said tracks, and an energy-absorbing member interposed between adjacent balls of said second plurality of balls.

5. The teaching apparatus of claim 4, further comprising means for adjusting the elevation of said ramp portion with respect to said level section.

* * * * *